(12) United States Patent
Watanabe

(10) Patent No.: US 11,381,742 B2
(45) Date of Patent: Jul. 5, 2022

(54) OPTICAL APPARATUS, IMAGE PICKUP APPARATUS, AND DRIVING METHOD OF OPTICAL APPARATUS

(71) Applicant: CANON KABUSHIKI KAISHA, Tokyo (JP)

(72) Inventor: Yutaka Watanabe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/924,540

(22) Filed: Jul. 9, 2020

(65) Prior Publication Data
US 2021/0021765 A1 Jan. 21, 2021

(30) Foreign Application Priority Data
Jul. 18, 2019 (JP) .............................. JP2019-132400

(51) Int. Cl.
| H04N 5/232 | (2006.01) |
| H04N 5/225 | (2006.01) |
| G02B 7/14 | (2021.01) |
| G02B 7/09 | (2021.01) |
| G03B 13/36 | (2021.01) |

(52) U.S. Cl.
CPC ......... *H04N 5/232411* (2018.08); *G02B 7/09* (2013.01); *G02B 7/14* (2013.01); *G03B 13/36* (2013.01); *H04N 5/2254* (2013.01); *H04N 5/23209* (2013.01)

(58) Field of Classification Search
CPC ........... H04N 5/232411; H04N 5/2254; H04N 5/23209; H04N 5/23212; H04N 17/002; G02B 7/14; G02B 7/09; G02B 7/08; G03B 13/36; G03B 3/10; G03B 17/14; G03B 17/565; G03B 2217/007; G03B 2206/00

See application file for complete search history.

(56) References Cited

U.S. PATENT DOCUMENTS

| 2007/0133970 A1* | 6/2007 | Honjo ...................... G03B 3/10 396/97 |
| 2011/0075275 A1* | 3/2011 | Sugiura .................... G03B 5/00 359/817 |
| 2014/0307161 A1* | 10/2014 | Park ................. H04N 5/232411 348/372 |
| 2020/0096839 A1* | 3/2020 | Shigeta .................. H04N 5/232 |

FOREIGN PATENT DOCUMENTS

JP        H04150796 A       5/1992

* cited by examiner

*Primary Examiner* — Gevell V Selby
(74) *Attorney, Agent, or Firm* — Rossi, Kimms & McDowell LLP

(57) ABSTRACT

An optical apparatus attachable to an image pickup apparatus and switchable a power state between a first state and a second state that consumes a power less than the first state includes a driver that drives a driven member, a first detector configured to detect a driving amount of the driver or whether the driven member is located at a predetermined position, a memory that stores a signal value of the first detector when the power state of the optical apparatus is switched from the first state to the second state, and a determiner that determines that the driver is in an abnormal state when the signal value stored in the memory and the signal value of the first detector when the power state of the optical apparatus is switched from the second state to the first state are different from each other.

10 Claims, 9 Drawing Sheets

OPTICAL APPARATUS, IMAGE PICKUP APPARATUS, AND DRIVING METHOD OF OPTICAL APPARATUS

BACKGROUND OF THE INVENTION

Field of the Invention

The present invention relates to an optical apparatus, an image pickup apparatus, and a driving method of the optical apparatus.

Description of the Related Art

One of interchangeable lenses attachable to an image pickup apparatus performs the autofocus (AF) by moving a focus lens by a stepping motor. In the interchangeable lenses in which the focus lens (focus lens) closest to the object moves in the optical axis direction during the AF, or a manual focus operation ring rotates in association with the movement of the focus lens, the user may erroneously press these movable parts by hand. In such a case, the stepping motor is in a step-out state in which it does not rotate in response to a driving signal. Therefore, the interchangeable lens may be provided with step-out detector for detecting the step-out (abnormal rotation) of the stepping motor.

Japanese Patent Laid-Open No. 4-150796 discloses a method for detecting the step-out by using a deviation between a command pulse signal for driving a stepping motor and a detection signal from a rotation detector for detecting a rotation of an output shaft of the stepping motor.

Some interchangeable lenses include a reference position detector for detecting a reference position (driving origin position) for the focus lens, and perform a reference position detecting operation for detecting the reference position when the power is turned on. Some interchangeable lenses switch between a normal power state and a low power consumption state in which the power consumption is lower than that of the normal power state according to a command from the camera body. The interchangeable lens in the low power consumption state reduces the power consumption by cutting off the power supply to the rotation detector and the reference position detector described above, and thus cannot detect that the stepping motor has stepped out during the low power consumption state. On the other hand, if it is assumed that the stepping motor is in the step-out state during the low power consumption state and the reference position detection operation is performed again when the low power consumption state is switched to the normal power state, the user needs to wait for a long time until he is ready to capture an image.

SUMMARY OF THE INVENTION

The present invention provides an optical apparatus, an image pickup apparatus, and a driving method of an optical apparatus, each of which can detect an abnormal state of a driver that occurs during a low power consumption state.

An optical apparatus according to one aspect of the present invention is attachable to an image pickup apparatus and switchable a power state of the optical apparatus between a first state and a second state that consumes a power less than the first state. The optical apparatus includes a driver configured to drive a driven member, a first detector configured to detect a driving amount of the driver or whether or not the driven member is located at a predetermined position, a memory configured to store a signal value of the first detector when the power state of the optical apparatus is switched from the first state to the second state, and a determiner configured to determine that the driver is in an abnormal state when the signal value stored in the memory and the signal value of the first detector when the power state of the optical apparatus is switched from the second state to the first state are different from each other.

An image pickup apparatus according to another aspect of the present invention is switchable a power state of the image pickup apparatus between a first state and a second state having a power consumption lower than that of the first state. The image pickup apparatus includes a driver configured to drive a driven member, a first detector configured to detect a driving amount of the driver or whether or not the driven member is located at a predetermined position, a memory configured to store a signal value of the first detector when the power state of the image pickup apparatus is switched from the first state to the second state, and a determiner configured to determine that the driver is in an abnormal state when the signal value stored in the memory and the signal value of the first detector when the power state of the image pickup apparatus is switched from the second state to the first state are different from each other.

A driving method of the above optical apparatus also constitute another aspect of the present invention.

Further features of the present invention will become apparent from the following description of exemplary embodiments with reference to the attached drawings.

DESCRIPTION OF THE EMBODIMENTS

Figure 1:
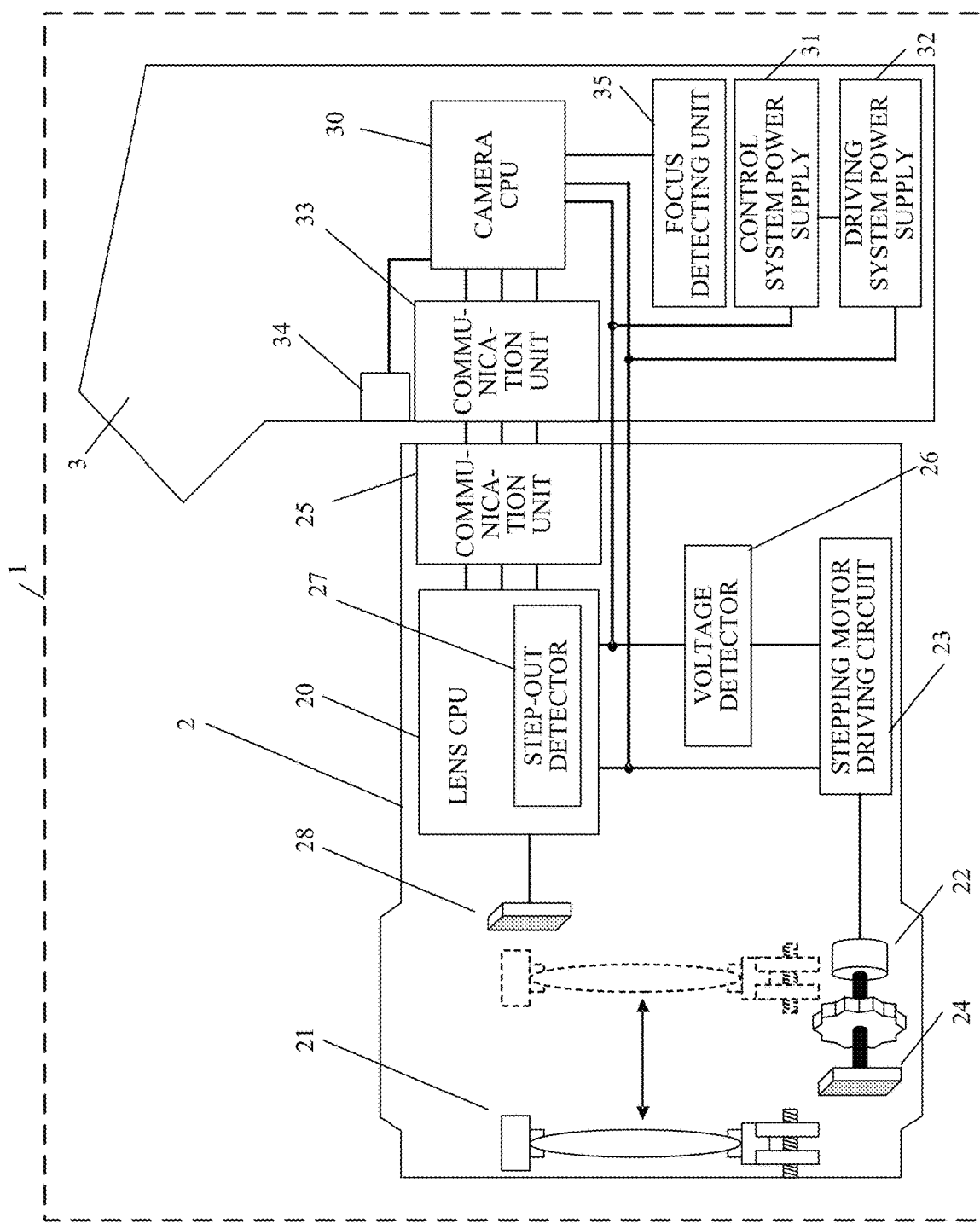
FIG. 1 is a block diagram of a camera system according to an embodiment of the present invention.

Referring now to the accompanying drawings, a detailed description will be given of embodiments according to the present invention. Corresponding elements in respective figures will be designated by the same reference numerals, and a duplicate description thereof will be omitted.

Structure

FIG. 1 is a block diagram of a camera system 1 according to one embodiment of the present invention. The camera system 1 includes an interchangeable lens (optical apparatus) 2 and an image pickup apparatus (referred to as a camera body hereinafter) 3 to which the interchangeable lens 2 is attachable. The interchangeable lens 2 is configured attachable to the camera body 3 in this embodiment, but may be configured integrated with the camera body 3.

The camera body 3 includes a camera CPU 30, a control system power supply 31, a driving system power supply 32, a communication unit 33, a lens attachment detector 34, and a focus detecting unit 35. The camera CPU 30 controls all operations in the camera body 3, and includes a RAM, ROM, EEPROM and the like. The control system power supply 31 supplies the power to a control system circuit that requires a stable output voltage, such as the focus detecting unit 35 and an unillustrated photometry unit, which consumes a relatively low power. The driving system power supply 32 detects the voltage or power of the control system power supply 31 and supplies the power to a driving system circuit that consumes a relatively large amount of power, such as the interchangeable lens 2 and an unillustrated shutter controller.

The communication unit 33 has a plurality of communication terminals for the camera CPU 30 to communicate with the lens CPU 20 described later, and sends AF information and photometric information from the camera CPU 30 to a communication unit 25 on the interchangeable lens 2 side. The communication unit 33 receives lens ID information and step-out information described later from the communication unit 25 and transfers them to the camera CPU 30. The lens attachment detector 34 detects that the interchangeable lens 2 is attached to the camera body 3. The focus detecting unit 35 performs a focus detection in accordance with a phase difference detecting method that detects a focus state (defocus amount) of the image pickup optical system based on a phase difference between a pair of images obtained by dividing the light passing through the image pickup optical system in the interchangeable lens 2.

The interchangeable lens 2 includes a lens CPU 20, an image pickup optical system including a focus lens 21 (focus lens unit), a stepping motor 22, a stepping motor driving circuit 23, a rotation sensor 24, the communication unit 25, a voltage detector 26, a step-out detector 27, and a reference position sensor 28. In this embodiment, the focus lens 21 is disposed closest to the object in the image pickup optical system.

The lens CPU 20 is a controller that controls all operations in the interchangeable lens 2 together with the camera CPU 30. The lens CPU 20 includes a RAM, a ROM, an EEPROM and the like. The lens CPU 20 also includes the step-out detector 27 as a determiner that determines whether or not the stepping motor (driver) 22 steps out. The step-out detector 27 detects whether the stepping motor 22 is in the step-out state by using the rotation sensor 24 when the interchangeable lens 2 is in the normal power state. When the low power consumption state is changed to the normal power state, it detects, based on the signal value from the rotation sensor 24 and/or the reference position sensor 28, whether or not the stepping motor 22 steps out during the low power consumption state.

The stepping motor driving circuit 23 rotationally drives the stepping motor 22 according to a command from the lens CPU 20. The rotational driving force of the stepping motor 22 is transmitted as a driving force in the optical axis direction to the focus lens 21 as a driven member via the driving force transmitting mechanism. The lens CPU 20 rotates the stepping motor 22 via the stepping motor driving circuit 23 according to the AF information (information including the focus lens driving amount according to the defocus amount) from the camera CPU 30. Thereby, the focus lens 21 moves in the optical axis direction, and the autofocus (AF) is performed. When the focus lens 21 moves, the length of the image pickup optical system in the optical axis direction changes. The stepping motor 22 is used as the driver in this embodiment, but a DC motor or an ultrasonic motor may be used.

The interchangeable lens 2 is provided with an unillustrated manual focus operation member. When the manual focus operation member is operated (for example, rotated) by the user, the lens CPU 20 drives the stepping motor 22 in accordance with the operation direction and the operation amount. Thereby, the manual focus (MF) is performed.

The rotation sensor (detector) 24 detects the rotation of the stepping motor 22. FIG. 1 illustrates an example in which the rotation sensor 24 is connected to the output shaft of the stepping motor 22 and directly detects the rotation of the stepping motor 22.

The communication unit (communicator) 25 has a plurality of communication terminals for communicating with the camera CPU 30. The voltage detector 26 detects the voltage value of the driving voltage supplied from the driving system power supply 32 in the camera body 3.

The reference position sensor (detector) 28 detects whether or not the focus lens 21 is located at the reference position (predetermined position). The reference position sensor 28 is disposed so that its output value changes according to the position of the focus lens 21 in the optical axis direction. The lens CPU 20 detects a change point of the output value of the reference position sensor 28 while moving the focus lens 21 in the optical axis direction. The lens CPU 20 performs an operation (referred to as a reset operation hereinafter) that sets the position of the focus lens 21 where the change point is detected to a reference position (reset position). The reset operation is performed when the lens CPU 20 determines that it is necessary to detect the reference position of the focus lens 21. It is necessary to detect the reference position of the focus lens 21 when the power supply to the lens CPU 20 is started, when the stepping motor 22 steps out, or when the camera CPU 30 gives the instruction via the communication unit 25.

According to the instruction from the camera CPU 30 notified via the communication unit 25, the lens CPU 20 switches the power state of the interchangeable lens 2 between a normal power state (first state) and a low power consumption state (power saving state, second state) in which the power consumption is lower than that of the normal power state. When the interchangeable lens 2 is in the low power consumption state, the power supply to the rotation sensor 24 and the reference position sensor 28 is also cut off, and the detection by each sensor is disabled. On the other hand, when the interchangeable lens 2 is in the normal power state, the power is supplied to the rotation sensor 24 and the reference position sensor 28, and the detection by each sensor is enabled.

Figure 2:
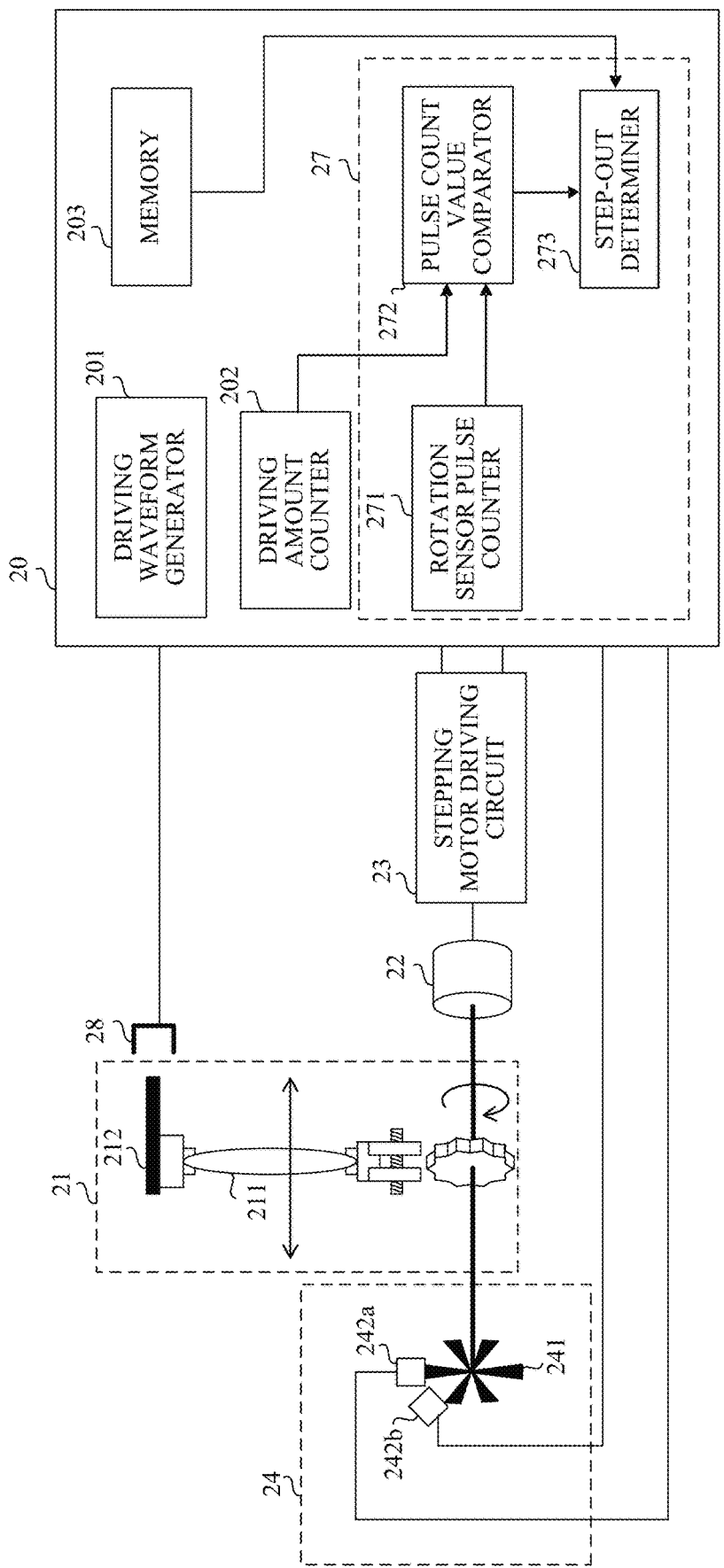
FIG. 2 is a block diagram of a step-out detecting system for detecting a step-out of a stepping motor in an interchangeable lens.

FIG. 2 is a block diagram of a step-out detecting system for detecting the step-out of the stepping motor 22, and illustrates the details of the rotation sensor 24, the step-out detector 27, and the reference position sensor 28. A driving waveform generator 201 generates a driving signal for driving the stepping motor 22. The generated driving signal is converted into a necessary current/voltage by the stepping motor driving circuit 23 and supplied to the stepping motor 22. A driving amount counter 202 controls a driving amount of the stepping motor 22 by incrementing or decrementing the counter for each change of an excitation pattern generated by the driving waveform generator 201. A memory 203 stores the signal value of the reference position sensor 28 and the signal value of the rotation sensor 24 when the interchangeable lens 2 switches from the normal power state to the low power consumption state.

A pulse plate 241 includes light-shielding parts and light-transmitting parts that are alternately arranged and is attached to the output shaft (driving force transmitting mechanism) of the stepping motor 22 so that the pulse plate 241 can rotate integrally with the output shaft. When the light-shielding part of the pulse plate 241 passes between the light emitter and the light receiver of each of the two photo-interrupters 242a and 242b, the output from each photo-interrupter changes and a pulse signal (output pulse) is generated. By counting this output pulse, the rotation amount of the stepping motor 22 (the relative position to the position when the focus lens 21 is located at a predetermined position) can be detected. Since the two photo-interrupters 242a and 242b output the output pulses having different phases, the detection accuracy of the rotation amount can be improved and the rotational direction can be detected by using these output pulses. This embodiment illustrates an example in which the rotation sensor 24 includes the pulse plate 241 and the photo-interrupters 242a and 242b, but other rotation sensors may be used as long as the rotation of the stepping motor 22 is detectable.

The reference position sensor 28 includes a photo-interrupter. The focus lens 21 includes a lens unit 211 that transmits light from an object and a light-shielding plate 212. When the focus lens 21 is moved in the optical axis direction, the light-shielding plate 212 moves so as to be inserted into and removed from a space between the light emitter and the light receiver of the reference position sensor 28. Therefore, the output signal from the reference position sensor 28 switches at a predetermined position in the movable range of the focus lens 21 as a boundary. The reference position of the focus lens 21 can be detected by detecting this switching position. This embodiment illustrates an example in which the reference position sensor 28 includes the photo-interrupter, but another sensor may be used as long as the reference position of the focus lens 21 is detectable.

A rotation sensor pulse counter 271 detects the rotation amount of the stepping motor 22 by incrementing or decrementing the counter in accordance with the pattern change in the output pulse from the rotation sensor 24 (photo-interrupters 242a and 242b). A pulse count comparator 272 compares the driving amount count value output from the driving amount counter 202 with the rotation sensor pulse count value output from the rotation sensor pulse counter 271. A step-out determination unit 273 determines whether or not the stepping motor 22 is in the step-out state based on the output from the pulse count comparator 272. More specifically, the step-out determination unit 273 determines that the stepping motor 22 steps out when the output result of the pulse count comparator 272 (a deviation amount between the driving amount count value and the rotation sensor pulse count value) is equal to or larger than a predetermined threshold value (or is larger than the threshold value). The step-out determination unit 273 determines that the stepping motor 22 is in the normal driving state when the output result is smaller than the predetermined threshold value (or equal to or less than the threshold value).

The step-out determination unit 273 also determines whether or not the stepping motor 22 is in the step-out state, based on the signal values of the rotation sensor 24 and the reference position sensor 28 and the stored value of the memory 203. More specifically, the step-out determination unit 273 determines that the stepping motor 22 steps out when the signal value of each sensor stored in the memory 203 and the signal value of each sensor acquired are different from each other when the interchangeable lens 2 switches from the low power consumption state to the normal power state. On the other hand, the step-out determination unit 273 determines that the stepping motor 22 is in the normal driving state when the signal value of each sensor stored in the memory 203 is equal to the signal value of each sensor acquired when the interchangeable lens 2 switches from the low power consumption state to the normal power state.

This embodiment illustrates an example in which the step-out determination uses the signal values of the rotation sensor 24 and the reference position sensor 28, but the step-out determination may use the signal value of the rotation sensor 24 or the reference position sensor 28. That is, when the signal value of the rotation sensor 24 stored in the memory 203 and the signal value of the rotation sensor 24 acquired when the power state of the interchangeable lens 2 is switched from the low power consumption state to the normal power state are different from each other, it determines the step-out state. Similarly, if the signal value of the reference position sensor 28 stored in the memory 203 is different from the signal value of the reference position sensor 28 acquired when the interchangeable lens 2 is switched from the low power consumption state to the normal power state, it determines the step-out state.

Explanation of Step-Out Detection

Figure 3:
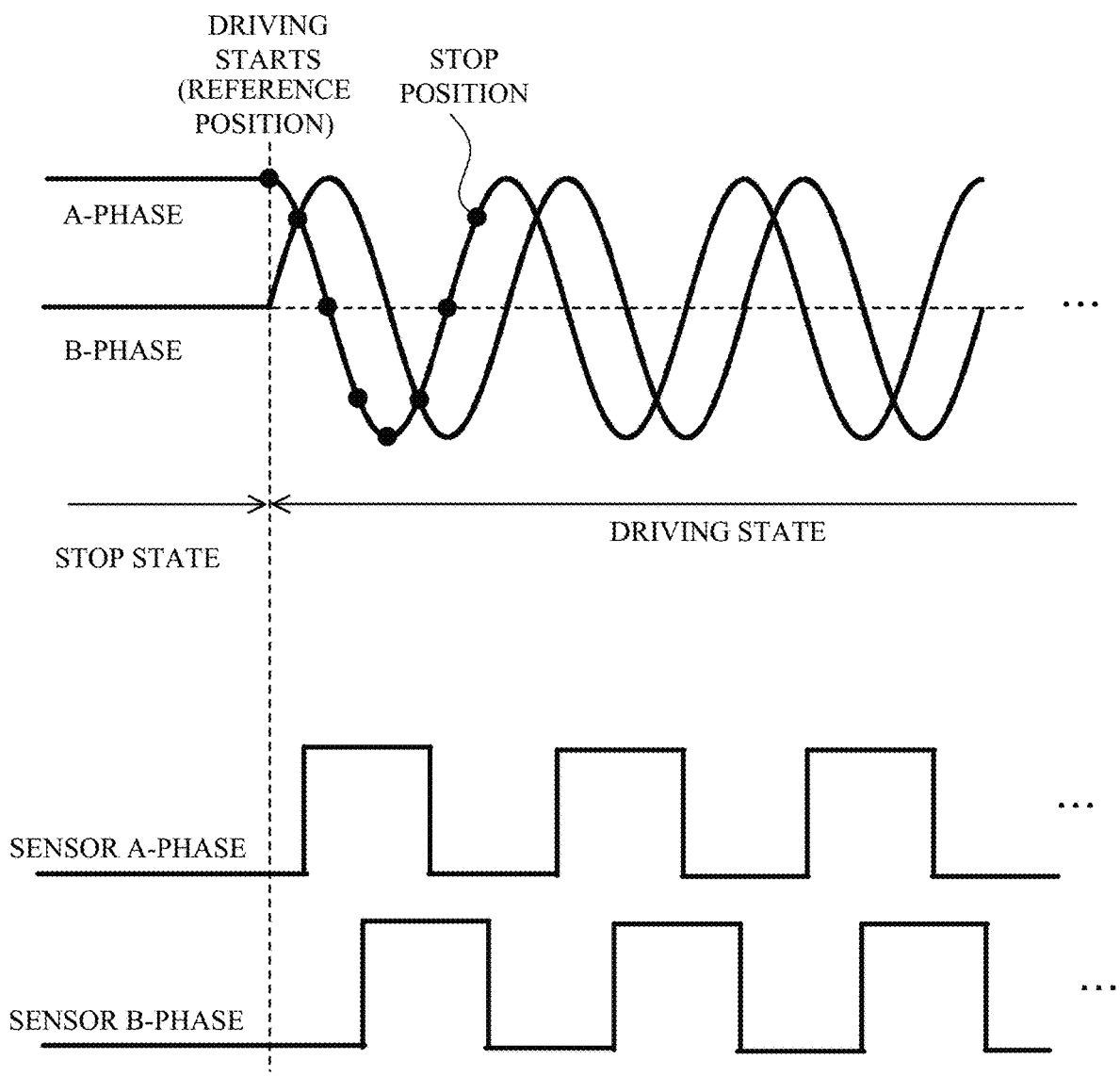
FIG. 3 illustrates a relationship between a driving waveform of a stepping motor and an output pulse from a rotation sensor.

FIG. 3 illustrates a relationship between the voltage (or current) waveform of the driving signal for the stepping motor 22 and the ideal output pulse from the rotation sensor 24. FIG. 3 assumes a two-phase stepping motor as the stepping motor 22, and premises that a sinusoidal driving signal is applied to the A-phase and the B-phase for microstep driving.

There are eight stop positions (step positions) indicated by black dots for the stepping motor 22 within an electrical angle of 360 degrees (°). The driving amount of the stepping motor 22 is counted by the driving amount counter 202 for each stop position. The output of the photo-interrupter 242a is set to a sensor A-phase, and the output of the photo-interrupter 242b is set to a sensor B-phase.

When the stepping motor 22 rotates at a constant speed, the output pulse from the rotation sensor 24 is a High/Low repetitive pulse with a duty ratio of about 50% for both the sensor A-phase and the sensor B-phase. In order to detect the rotational direction of the stepping motor 22, the photo-interrupter 242b is disposed with a phase shift of 90° relative to the photo-interrupter 242a. The relationship between one step in the driving amount of the stepping motor 22 and one output pulse from the rotation sensor 24 is determined by the widths of the light-shielding part and the light-transmitting part of the pulse plate 241. FIG. 3 illustrates that the rotation sensor 24 outputs four output pulses for eight steps in the driving amount of the stepping motor 22.

Figure 4:
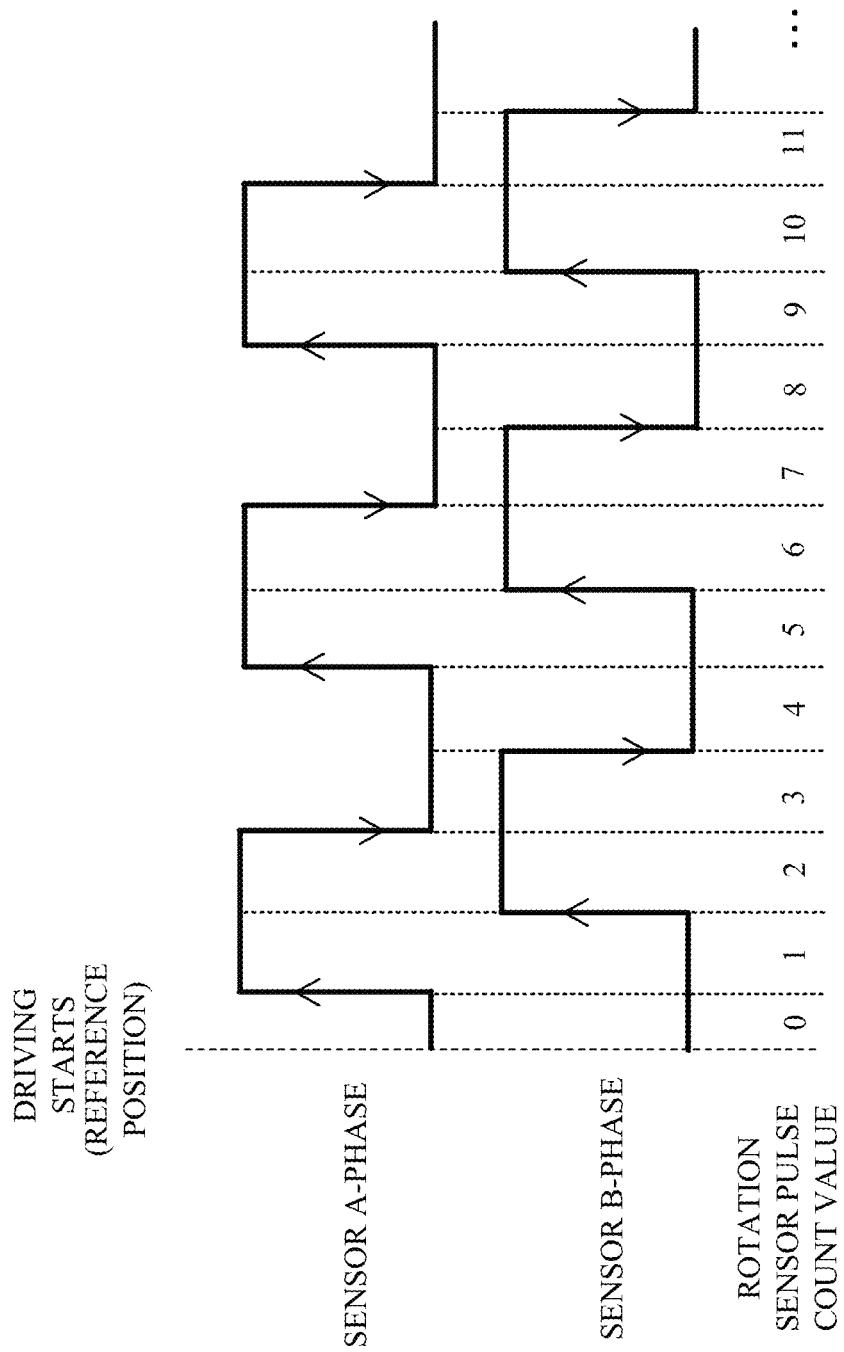
FIG. 4 illustrates a counting method of the output pulse from the rotation sensor.

FIG. 4 illustrates a method of counting the output pulses from the rotation sensor 24. The rotation sensor pulse counter 271 increments and decrements the pulse count by using High and Low switching edges of the sensor A-phase and the sensor B-phase as triggers. Although the count is incremented in FIG. 4, the count is decremented when the rotational direction of the stepping motor 22 is reversed.

Figure 5:
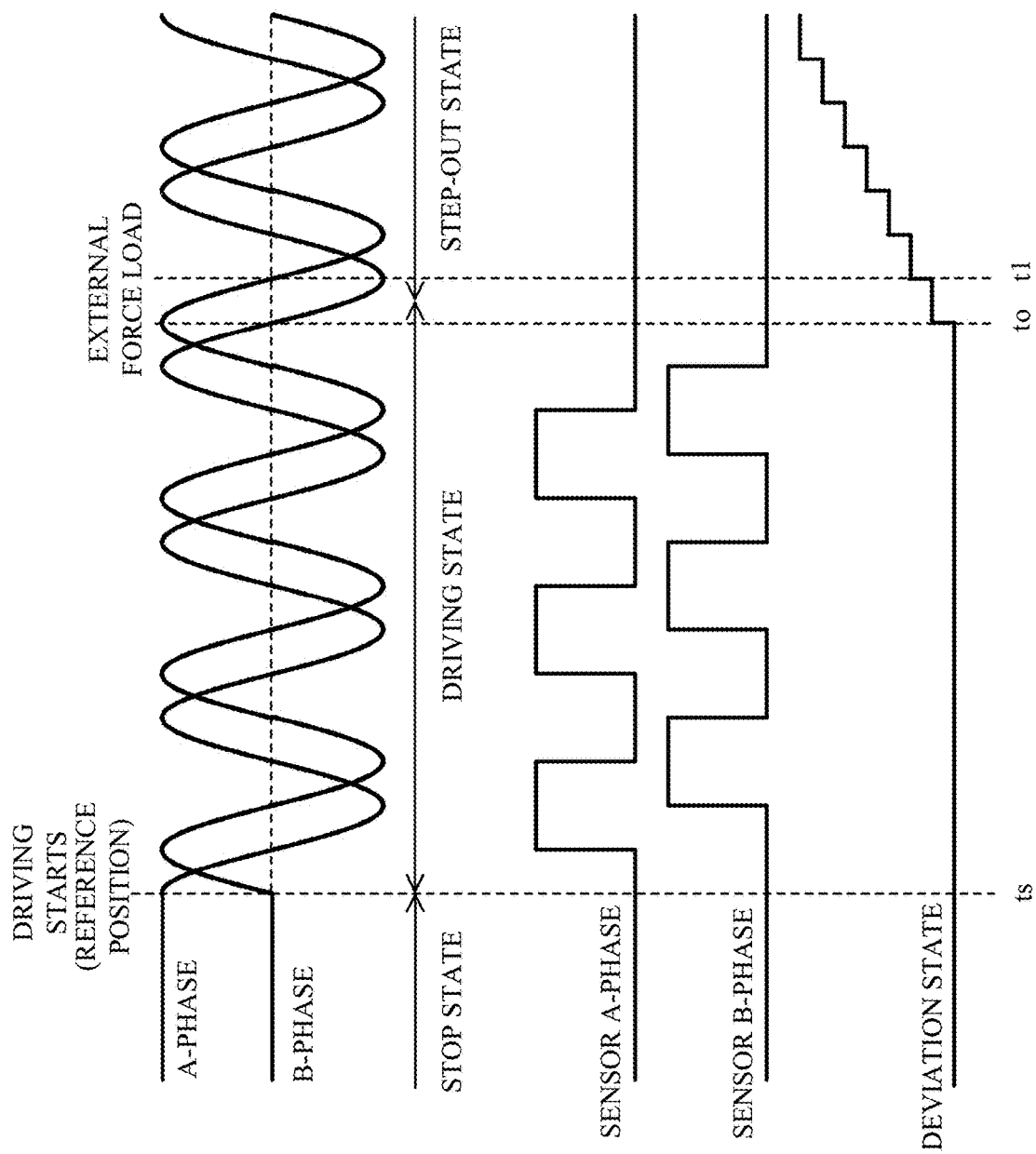
FIG. 5 illustrates a relationship between the driving waveform of the stepping motor and the output pulse from the rotation sensor.

FIG. 5 illustrates a relationship between the driving waveforms of the stepping motor 22 in the normal driving state and the step-out state and the output pulses from the rotation sensor 24. FIG. 5 also illustrates a deviation amount as the output result from the pulse count comparator 272 between the normal driving state and the step-out state. ts indicates time when the driving of the stepping motor 22 is started, and to indicates time when the stepping motor 22 steps out. When the rotation of the stepping motor 22 is stopped due to the step-out at the time to, the output of the rotation sensor 24 does not change even if the driving signal is input to the stepping motor 22. As described with reference to FIG. 3, in the normal driving state, the rotation sensor 24 outputs four output pulses for eight steps in the driving amount of the stepping motor 22. Therefore, the pulse count comparator 272 compares a value obtained by dividing the output result of the driving amount counter 202 by 2 with the output result of the rotation sensor pulse counter 271, and outputs the deviation amount (difference).

The step-out determination unit 273 determines that the stepping motor 22 is in the step-out state when the output result of the pulse count comparator 272 is equal to or larger than the predetermined threshold value as described above. For example, if it is assumed that the predetermined threshold value is 2, the output of the pulse count comparator 272 becomes 2 at time t1, so the step-out determination unit 273 determines that the stepping motor 22 is in the step-out state at that time. The predetermined threshold does not necessarily have to be 2. For example, the value may be set to a value greater than 2 in consideration of the influence of the driving delay relative to the input driving signal and vibrations of the stepping motor 22.

Figure 6:
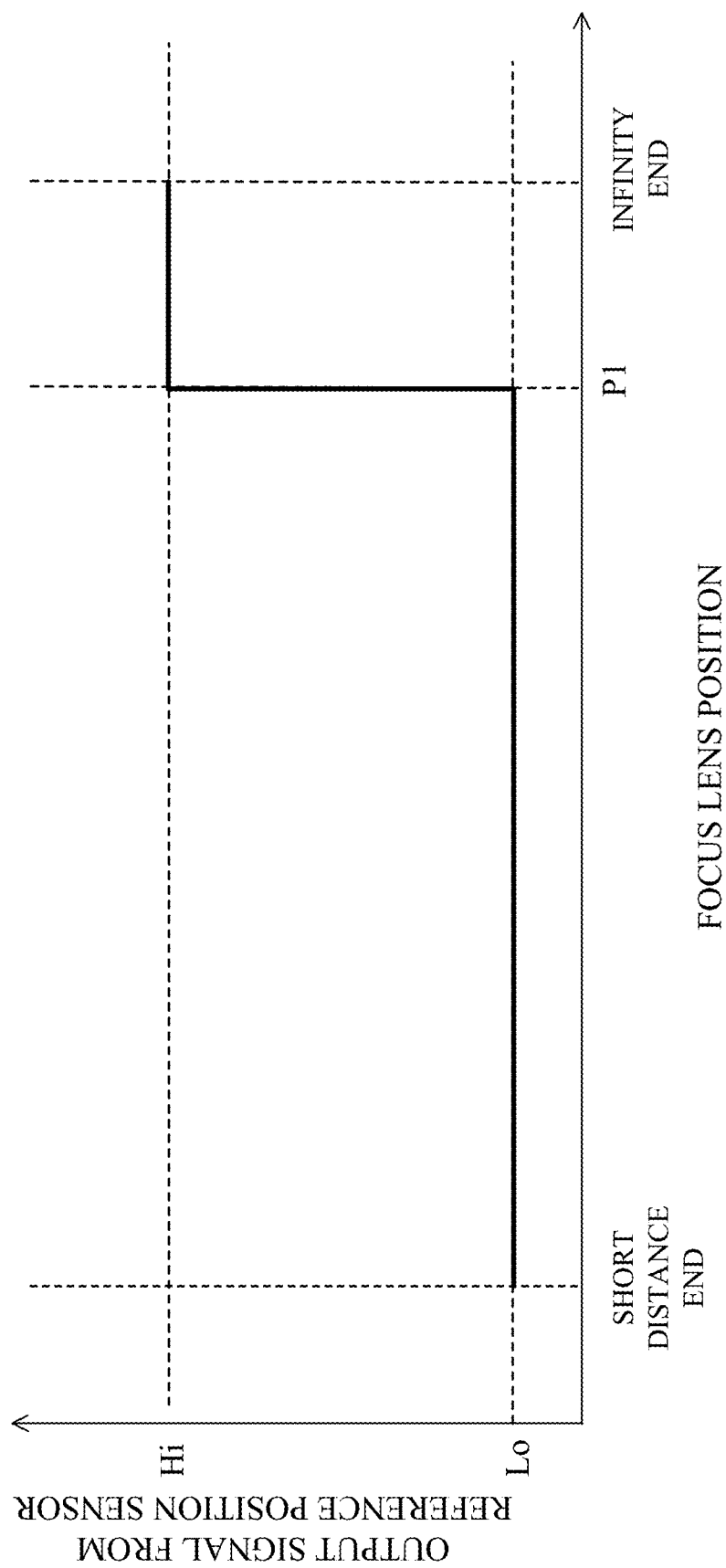
FIG. 6 illustrates a relationship between an output signal of a reference position sensor and a position of a focus lens.

FIG. 6 illustrates a relationship between the output signal of the reference position sensor 28 and the position of the focus lens 21. A position P1 is the reference position of the focus lens 21, and the output signal of the reference position sensor 28 switches at the position P1 as a boundary. That is, when the focus lens 21 is located nearer than the position P1, the light-shielding plate 212 of the focus lens 21 is not located between the light emitter and the light receiver in the reference position sensor 28, and the signal value of the reference position sensor 28 becomes Low ("Lo"). On the other hand, when the focus lens 21 is closer to the infinity than the position P1, the light-shielding plate 212 of the focus lens 21 is located between the light emitter and the light receiver of the reference position sensor 28, and the signal value of the reference position sensor 28 becomes High ("Hi").

For example, assume that when the interchangeable lens 2 is switched to the low power consumption state, the focus lens 21 is located at the short distance end position and the signal value of the reference position sensor 28 is Low. Then, when the user pushes in the movable part connected to the focus lens 21, the focus lens 21 may move to the infinity end position. When the power state of the interchangeable lens 2 is switched from the low power consumption state to the normal power state by the subsequent user operation (for example, pressing the button on the camera body 3), the signal value of the reference position sensor 28 becomes High.

The relationship between the output signal of the reference position sensor 28 and the position of the focus lens 21 may be reverse to the above relationship. That is, the signal value of the reference position sensor 28 may be High when the focus lens 21 is located on the short distance end side of the position P1, and the signal value of the reference position sensor 28 may be Low when the focus lens 21 is located on the infinity end side of the position P1.

Explanation of Control Flow

Figure 7:
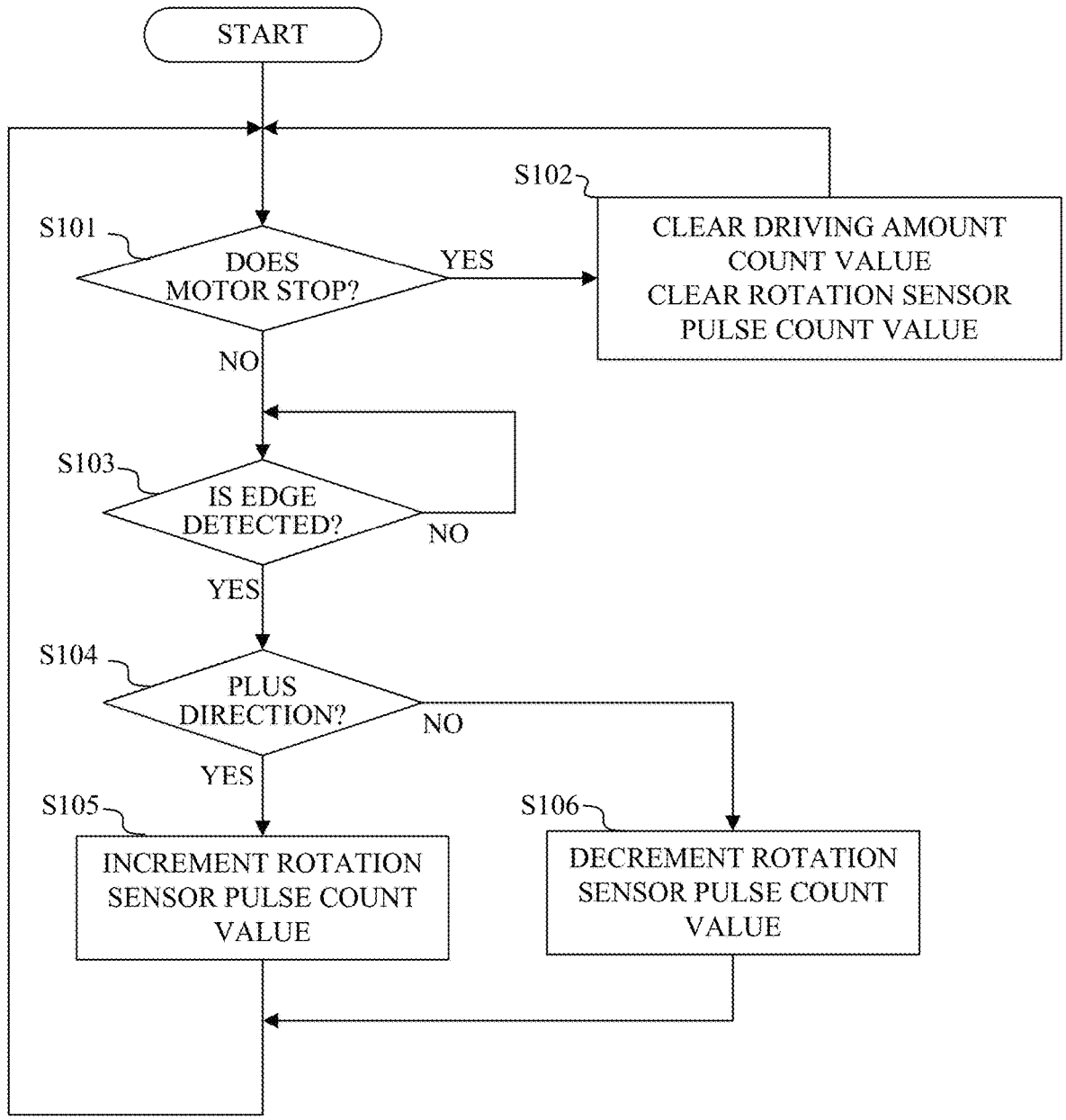
FIG. 7 is a flowchart showing motor rotation detecting processing.
Figure 8:
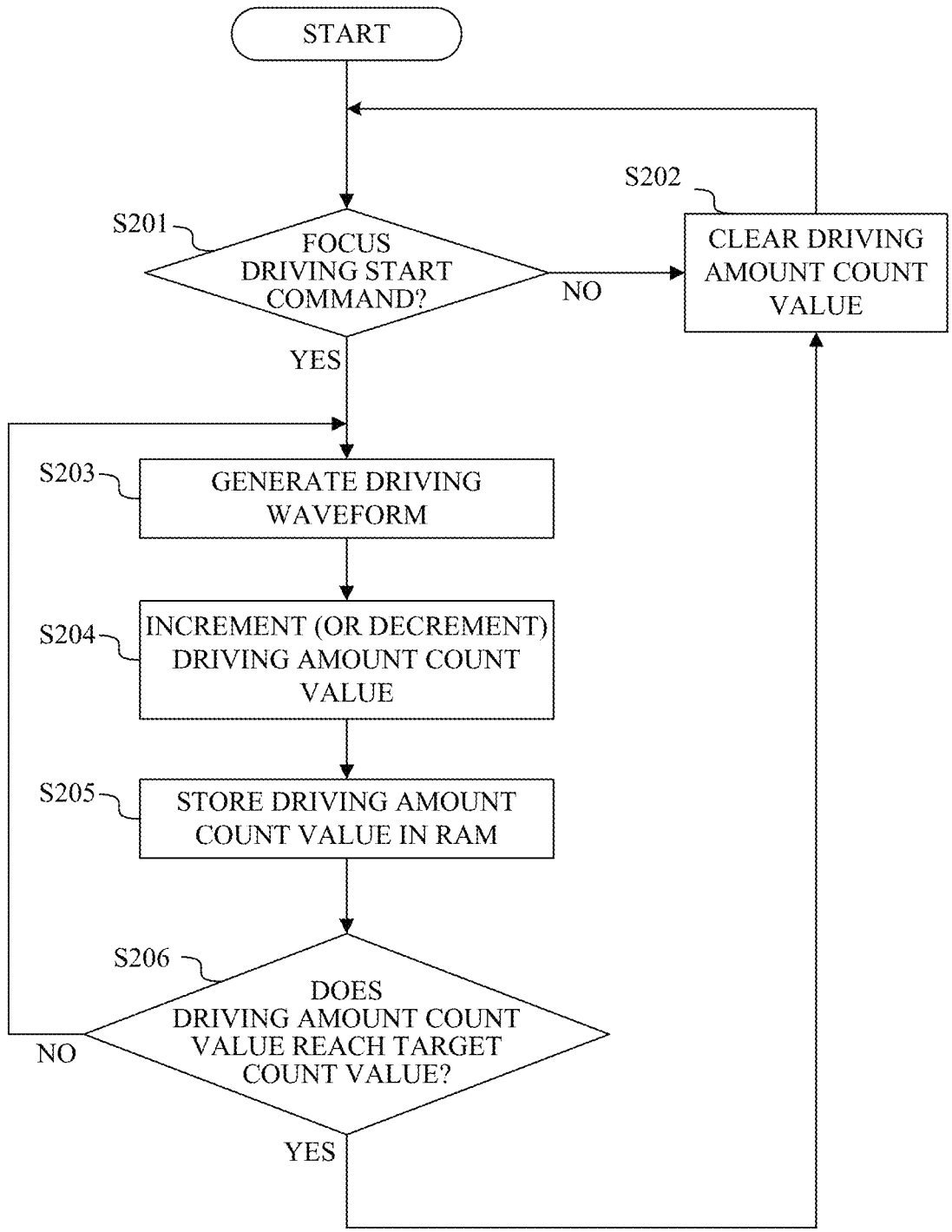
FIG. 8 is a flowchart showing motor driving amount controlling processing.
Figure 9:
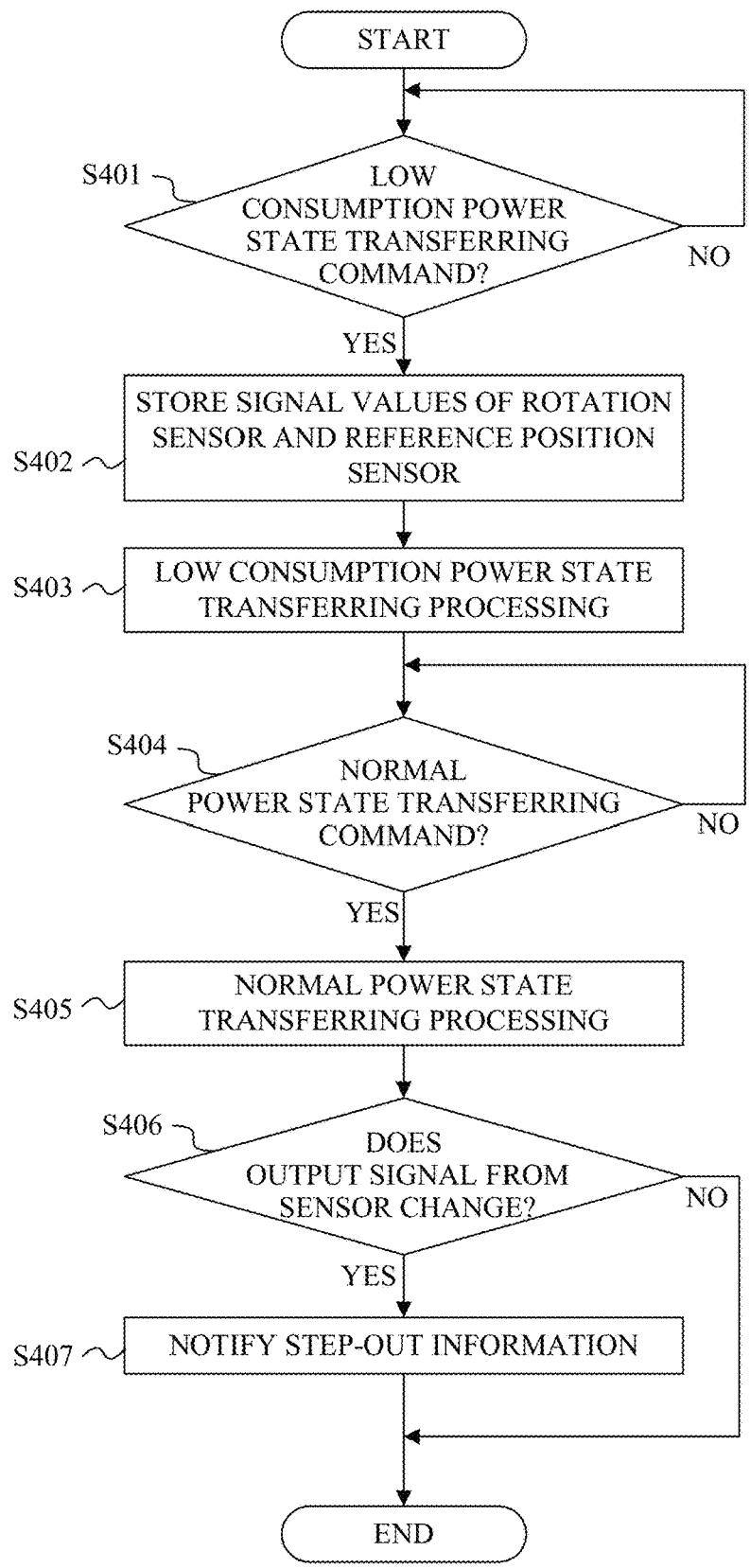
FIG. 9 is a flowchart showing step-out detecting processing.

Referring now to FIGS. 7 to 9, a description will be given of processing performed by the lens CPU 20 according to this embodiment.

FIG. 7 is a flowchart showing motor rotation detecting processing performed by the rotation sensor pulse counter 271.

In the step S101, the rotation sensor pulse counter 271 determines whether or not the stepping motor 22 is in the stop state. The stop state is a state in which no driving signal is generated and the stepping motor 22 is held at the stop position. If it is in the stop state, the flow proceeds to the step S102, and if it is not in the stopped state, the flow proceeds to the step S103.

In the step S102, the rotation sensor pulse counter 271 clears both of the driving amount count value and the rotation sensor pulse count value to 0. The processing of this step is processing corresponding to initialization processing when the stepping motor 22 is normally stopped in the normal driving state.

In the step S103, the rotation sensor pulse counter 271 determines whether the leading edge or the trailing edge of the output pulse from the rotation sensor 24 is detected. When the leading edge or the trailing edge is detected, the flow proceeds to the step S104, and when no leading or trailing edge is detected, the processing of this step is repeated. The processing in this step can reduce the processing load by using the external input interrupt function of the lens CPU 20.

In the step S104, the rotation sensor pulse counter 271 determines the rotational direction of the stepping motor 22 using the two output pulses from the two photo-interrupters 242a and 242b that form the rotation sensor 24. More specifically, the rotational direction of the stepping motor 22 is determined by using as triggers the leading and trailing edges of the two output pulses and by comparing the previous combination of High and Low of the two output pulses with the current combination. When the rotational direction is the plus direction (forward direction), the flow proceeds to the step S105, and when the rotational direction is the minus direction (reverse direction), the flow proceeds to the step S106.

In the step S105, the rotation sensor pulse counter 271 increments the rotation sensor pulse count value by one.

In the step S106, the rotation sensor pulse counter 271 decrements the rotation sensor pulse count value by one.

After the processing of the step S105 or S106, the flow returns to the step S101, and unless the stepping motor 22 is in the stop state, a series of operations is repeated. Due to the above processing, the rotation and the rotational direction of the stepping motor 22 can be detected.

FIG. 8 is a flowchart showing motor driving amount controlling processing of the stepping motor 22 performed by the driving waveform generator 201 and the driving amount counter 202.

In the step S201, the driving waveform generator 201 determines whether or not a focus drive start instruction has been received. The focus drive start instruction corresponds to AF information from the camera CPU 30 or a signal indicating that the manual focus operation member has been operated. When the focus drive start instruction is received, the flow proceeds to the step S203, and when the focus drive start instruction is not received, the flow proceeds to the step S202.

In the step S202, the driving amount counter 202 clears the driving amount count value to zero.

In the step S203, the driving waveform generator 201 generates a sinusoidal driving signal (driving waveform) to be applied to the A phase and B phase of the stepping motor 22.

In the step S204, the driving amount counter 202 increments or decrements the driving amount count value for each of the A-phase and B-phase excitation patterns corresponding to the step position in FIG. 3.

In the step S205, the driving amount counter 202 stores the incremented or decremented driving amount count value in the RAM.

In the step S206, the driving amount counter 202 determines whether the driving amount count value has reached the target count value corresponding to the driving amount designated according to the AF information or the operation of the manual focus operation member. When the driving amount count value reaches the target count value, the flow proceeds to the step S202 in order to clear the driving amount count value to zero so that the step-out detection can be performed when the stepping motor 22 is driven next time. On the other hand, when the driving amount count value has not reached the target count value, the flow proceeds to the step S203 in order for the driving waveform generator 201 to continue to generate the driving signal.

FIG. 9 is a flowchart showing the step-out detecting processing of the stepping motor 22 performed by the lens CPU 20 and the step-out detector 27.

In the step S401, the lens CPU 20 determines whether or not an instruction to switch the interchangeable lens 2 to the low power consumption state (low power consumption state transferring command) has been received from the camera CPU 30 via the communication unit 25. When the instruction to switch to the low power consumption state is received, the flow proceeds to the step S402, and when the instruction to switch to the low power consumption state is not received, the processing of this step is repeated.

In the step S402, the memory 203 stores the signal values of the rotation sensor 24 and the reference position sensor 28.

In the step S403, the lens CPU 20 performs processing of switching the interchangeable lens 2 to the low power consumption state (low power consumption state transferring processing). Since the processing of switching the interchangeable lens 2 to the low power consumption state includes the processing of cutting off the power supplies to the rotation sensor 24 and the reference position sensor 28, the step-out detection function by the rotation sensor 24 and the reference position sensor 28 are disabled after the processing of this step.

In the step S404, the lens CPU 20 determines whether or not the instruction to switch the interchangeable lens 2 to the normal power state (normal power state transferring command) is received via the communication unit 25. When the instruction to switch to the normal power state is received, the flow proceeds to the step S405, and when the instruction to switch to the normal power state is not received, the processing of this step is repeated.

In the step S405, the lens CPU 20 performs processing of switching the interchangeable lens 2 to the normal power state (normal power state transferring processing). Since the processing of switching the interchangeable lens 2 to the normal power state includes the processing of restarting the power supplies to the rotation sensor 24 and the reference position sensor 28, after the processing of this step, the step-out detection function by the rotation sensor 24 and the reference position sensor 28 is enabled.

In the step S406, the step-out determination unit 273 determines whether the signal values of the rotation sensor 24 and the reference position sensor 28 have changed. More specifically, the step-out determination unit 273 first acquires the current signal values of the rotation sensor 24 and the reference position sensor 28. The step-out determination unit 273 then compares the signal values of the rotation sensor 24 and the reference position sensor 28 stored in the memory 203 in the step S402 with the acquired signal values of the rotation sensor 24 and the reference position sensor 28. When the acquired signal value of each sensor is different from the signal value of each sensor stored in the memory 203, the flow proceeds to the step S407. On the other hand, when the acquired signal value of each sensor is equal to the signal value of each sensor stored in the memory 203, it is determined that the stepping motor 22 is in the normal driving state, and this flow ends.

In the step S407, the lens CPU 20 notifies the camera CPU 30 via the communication unit 25 of step out information indicating that the stepping motor 22 steps out. The camera CPU 30 resets the focus lens 21 via the lens CPU 20. The lens CPU 20 may execute the reset operation of the stepping motor 22 without notifying the camera CPU 30 of the step-out information. The focus lens 21 may be moved to a predetermined position instead of the reset position. While the lens CPU 20 performs the notification and the reset operation, the step-out determination unit 273 may perform these operations.

This embodiment has illustrated an example in which the step-out is determined using the signal values of the rotation sensor 24 and the reference position sensor 28, but the step-out may be determined using the signal value of the rotation sensor 24 or the reference position sensor 28. That is, only the signal value of the rotation sensor 24 is stored in the memory 203 in the step S402, and the current signal value of the rotation sensor 24 and the signal value of the rotation sensor 24 stored in the memory 203 may be used for the step-out determination in the step S406. Similarly, only the signal value of the reference position sensor 28 is stored in the memory 203 in the step S402, and the current signal value of the rotation sensor 28 and the signal value of the rotation sensor 28 stored in the memory 203 may be used for the step-out determination in the step S406.

In this embodiment, the signal values of the rotation sensor 24 and the reference position sensor 28 are stored in the memory 203 when the power state of the interchangeable lens 2 is switched from the normal power state to the low power consumption state. Thereafter, the step-out determination unit 273 acquires the signal values of the rotation sensor 24 and the reference position sensor 28 when the interchangeable lens 2 switches from the low power consumption state to the normal power state. Then, the step-out determination unit 273 compares the signal values of the rotation sensor 24 and the reference position sensor 28 stored in the memory 203, with the signal values of the rotation sensor 24 and the reference position sensor 28 when the power state of the interchangeable lens 2 is switched from the low power consumption state to the normal power state. When these signal values are different from each other, the step-out determination unit 273 determines that the stepping motor 22 steps out. This structure can detect the step-out of the stepping motor 22 that has occurred in the low power consumption state of the interchangeable lens 2.

The above embodiment can provide an optical apparatus, an image pickup apparatus, and a driving method of the optical apparatus, each of which can detect an abnormal state of a driver that may occur during a low power consumption state.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-132400, filed on Jul. 18, 2019, which is hereby incorporated by reference herein in its entirety.

What is claimed is:

1. An optical apparatus attachable to an image pickup apparatus and provided with a switchable power state of the optical apparatus between a first state and a second state that consumes a power less than the first state, the optical apparatus comprising:
a driver configured to drive a driven member;
a first detector configured to detect a driving amount of the driver or whether or not the driven member is located at a predetermined position;
a memory configured to store a signal value of the first detector when the power state of the optical apparatus is switched from the first state to the second state; and
a processor configured to:
compare the signal value stored in the memory with a signal value of the first detector when the power state of the optical apparatus is switched from the second state to the first state; and
determine that the driver is in an abnormal state when the signal value stored in the memory and the signal value of the first detector are different from each other, when the power state of the optical apparatus is switched from the second state to the first state.

2. The optical apparatus according to claim 1, further comprising:
a second detector different from the first detector and configured to detect whether or not the driven member is located at the predetermined position,
wherein the first detector detects, as a driving amount of the driver, a relative position of the driver to a position of the driver when the driven member is located at the predetermined position.

3. The optical apparatus according to claim 1, wherein: the driver is a stepping motor, and
the abnormal state means that the stepping motor steps out.

4. The optical apparatus according to claim 1, wherein: the driven member is a lens unit disposed closest to an object, and
as the lens unit moves, a length of an optical system in an optical axis direction changes.

5. The optical apparatus according to claim 1, further comprising:
a communicator configured to communicate with the image pickup apparatus,
wherein the determiner notifies the image pickup apparatus that the driver is in the abnormal state when determining that the driver is in the abnormal state.

6. The optical apparatus according to claim 5, wherein the processor is further configured to:
notify the image pickup apparatus that the driver is in the abnormal state; and
then control the driver to move the driven member to the predetermined position according to an instruction from the image pickup apparatus.

7. The optical apparatus according to claim 1, wherein the driver drives the driven member so that the driven member is located at the predetermined position when the processor determines that the driver is in the abnormal state.

8. The optical apparatus according to claim 1, wherein:
an operation of the first detector is enabled in the first state, and
operation of the first detector is disabled in the second state.

9. An image pickup apparatus provided with a switchable power state between a first state and a second state having a power consumption lower than that of the first state, the image pickup apparatus comprising:
a driver configured to drive a driven member;
a first detector configured to detect a driving amount of the driver or whether or not the driven member is located at a predetermined position;
a memory configured to store a signal value of the first detector when the power state of the image pickup apparatus is switched from the first state to the second state; and
a processor configured to:
compare the signal value stored in the memory with a signal value of the first detector when the power state of the optical apparatus is switched from the second state to the first state; and
determine that the driver is in an abnormal state when the signal value stored in the memory and the signal value of the first detector are different from each other, when the power state of the image pickup apparatus is switched from the second state to the first state, are different from each other.

10. A driving method of an optical apparatus attachable to an image pickup apparatus and provided with a switchable power state of the optical apparatus between a first state and a second state that consumes a power less than the first state, the driving method comprising:
storing a signal value of a first detector when the power state of the optical apparatus is switched from the first state to the second state, the first detector being configured to detect a driving amount of a driver or whether or not a driven member driven by the driver is located at a predetermined position;
compare the signal value stored in the memory with a signal value of the first detector when the power state of the optical apparatus is switched from the second state to the first state; and
determining that the driver is in an abnormal state when the stored signal value and the signal value of the first detector are different from each other, when the power state of the optical apparatus is switched from the second state to the first state.

* * * * *